(12) United States Patent
Millar et al.

(10) Patent No.: US 10,516,503 B1
(45) Date of Patent: Dec. 24, 2019

(54) DISTRIBUTION MATCHER

(71) Applicant: Mitsubishi Electric Research Laboratories, Inc., Cambridge, MA (US)

(72) Inventors: David Millar, Concord, MA (US); Tobias Fehenberger, Munich (DE); Toshiaki Koike-Akino, Belmont, MA (US); Kieran Parsons, Rockport, MA (US); Keisuke Kojima, Weston, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 16/281,015

(22) Filed: Feb. 20, 2019

(51) Int. Cl.
*H04L 27/00* (2006.01)
*H04L 1/00* (2006.01)
*G06N 7/00* (2006.01)

(52) U.S. Cl.
CPC ........... *H04L 1/0042* (2013.01); *G06N 7/005* (2013.01)

(58) Field of Classification Search
CPC .............................. H04L 1/0042; G06N 7/005
See application file for complete search history.

(56) References Cited

U.S. PATENT DOCUMENTS

| | | | |
|---|---|---|---|
| 2018/0091225 A1* | 3/2018 | Wang | H03M 13/6312 |
| 2019/0036550 A1* | 1/2019 | Koike-Akino | H03M 13/13 |
| 2019/0215077 A1* | 7/2019 | Chien | H04L 25/4927 |

* cited by examiner

*Primary Examiner* — Dhaval V Patel
(74) *Attorney, Agent, or Firm* — Gennadiy Vinokur; Hironori Tsukamoto; James McAleenan

(57) ABSTRACT

A communication system includes a data source to receive a block of bits, a processor, a memory, in connection with the processor, to store a distribution matcher associated with a probability mass function (PMF) configured to match a block of equally likely input bits to a fixed number of output bits with values distributed according to the PMF of the distribution matcher using the processor. In this case, the distribution matcher contains a set of parallel binary distribution matchers which specify fully a target PMF, and a transmitter front end to transmit a block of shaped bits over a communication channel, such that bits in a sequence of the blocks of shaped bits are distributed according to the target PMF.

18 Claims, 17 Drawing Sheets

DISTRIBUTION MATCHER

TECHNICAL FIELD

This invention relates generally to digital communications systems, and more specifically to a distribution matcher for high-throughput digital communication systems.

BACKGROUND OF THE INVENTION

Applications for optical fiber transmission systems, wireless systems, or co-axial cable systems, there exist many approaches to probabilistic shaping, which can demonstrate a sub-optimal gain, such as shell-mapping and trellis coded modulation. In order to approach the maximum achievable gain, the best known method in the literature for probabilistic shaping is the use of a constant composition distribution matcher (CCDM), whereby every possible output sequence has the same per-symbol probability distribution and therefore the same "composition". This method requires output sequence lengths on the order of thousands of symbols in order to achieve good performance. A significant problem with this method is that the only known mapping and demapping algorithms (which map and demap uniformly distributed input bits to shaped output sequences) operate sequentially on the input or output symbol sequence. Good performance is therefore only achieved at the cost of latency, which makes implementation in hardware impossible.

Accordingly, there is need to develop a low complexity method and system for matching and dematching these CCDM sequences.

SUMMARY OF THE INVENTION

The present invention is related to the field of digital communications, specifically in the area of high-throughput systems where the channel capacity is to be approached closely. Examples of applications for this system could be optical fiber transmission systems, wireless systems, or co-axial cable systems.

Some embodiments are based on recognition that a communication system includes a data source to receive a block of bits; a memory to store a distribution matcher, associated with a probability mass function (PMF) to match a block of equally likely input bits to a fixed number of output bits with values distributed according to the PMF of the distribution matcher, wherein the distribution matcher contains a set of parallel binary distribution matchers which specify fully a target PMF; and a transmitter front end to transmit a block of shaped bits over a communication channel, such that bits in a sequence of the blocks of shaped bits are distributed according to the target PMF.

According to embodiments of the present invention, it becomes possible to reduce central processing unit (CPU or digital signal processor) usage, power consumption and/or network bandwidths usages, since embodiments can provide a low complexity method and system for matching and dematching these CCDM sequences by using only integer arithmetic, by way of considering the algorithm as a number of parallel binary distribution matchers and dematchers, which are solving a number of subset ranking and deranking problems. Accordingly, the embodiments of the present invention can provide the improvement of the functions of the processor (CPU), because the target symbol sequence can be broken down into several parallel binary sequences, to be separately matched and dematched, so that sufficiently reduction in serialism of 10-100× is possible for realistic sequence lengths.

Further, according to embodiments of the present invention, a method for communicating symbols of bits, wherein the method uses a processor coupled with stored instructions stored in a memory for implementing the method. In this case, the instructions, when executed by the processor carry out at least some steps of the method, include receiving a block of bits; sending blocks of bits to a set of binary distribution matchers from the memory storing a set of binary distribution matchers, wherein each binary distribution matcher is associated with a probability mass function (PMF) to match equally likely input bits to a fixed number of output bits with values distributed according to the PMF of a distribution matcher, wherein each binary distribution matcher is associated with a binary distribution, such that a combination of the binary distribution matchers equals a target PMF; mapping the blocks of bits to blocks of shaped bits with a non-uniform distribution using the set of binary distribution matchers; combining the blocks of shaped bits using a structure determined by the binary distribution matchers; and transmitting the blocks of shaped bits over a communication channel, such that bits in a sequence of the blocks of shaped bits are distributed according to the target PMF.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

Figure 1A:
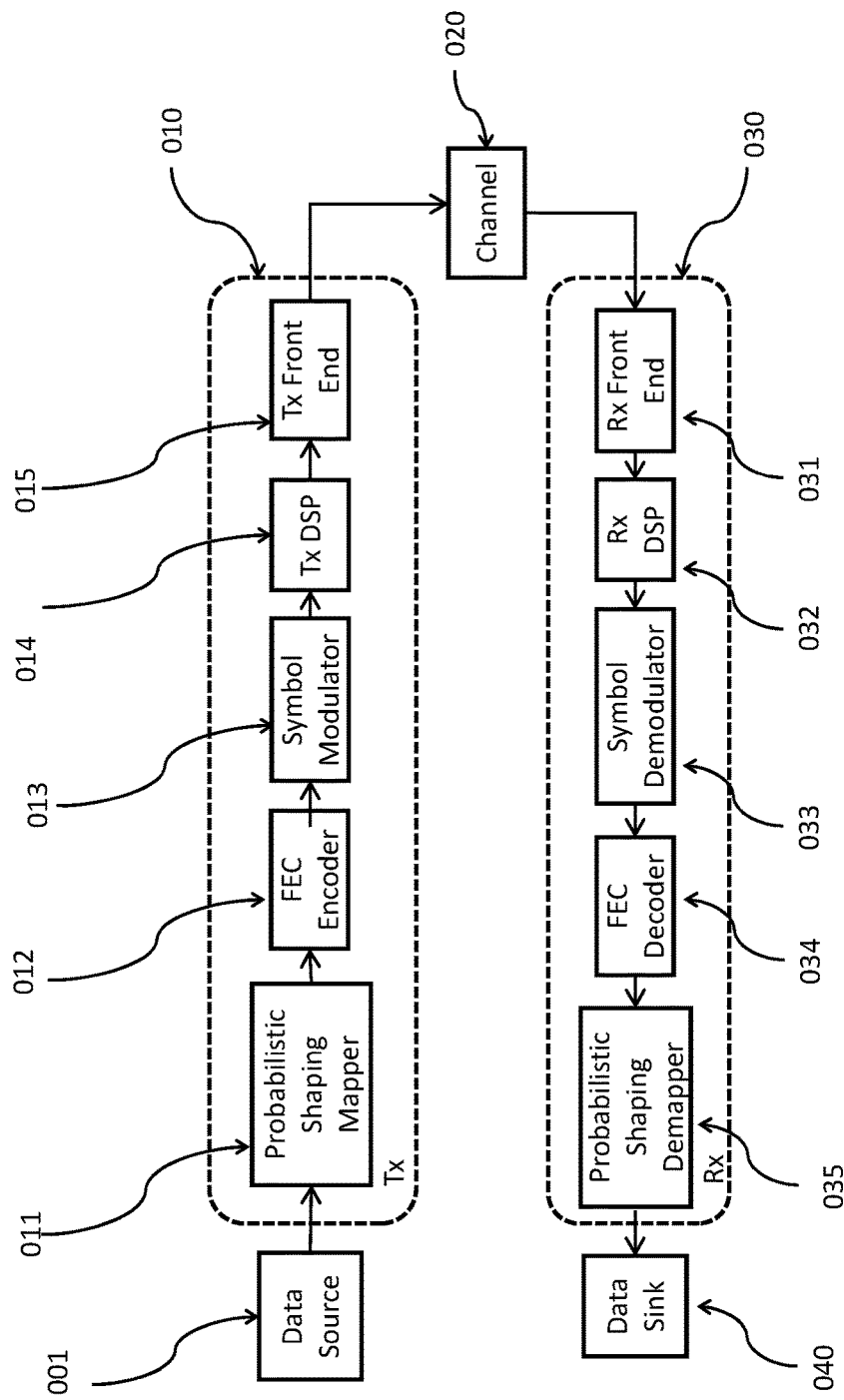
FIG. 1A shows a block diagram of a probabilistically shaped digital communication system, according to some embodiments.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION OF THE PREFERRED EMBODIMENTS

Various embodiments of the present invention are described hereafter with reference to the figures. It would be noted that the figures are not drawn to scale elements of similar structures or functions are represented by like reference numerals throughout the figures. It should be also noted that the figures are only intended to facilitate the description of specific embodiments of the invention. They are not intended as an exhaustive description of the invention or as a limitation on the scope of the invention. In addition, an aspect described in conjunction with a particular embodiment of the invention is not necessarily limited to that embodiment and can be practiced in any other embodiments of the invention.

FIG. 1A shows a block diagram of a probabilistically shaped digital communication system according to some embodiments. It should be noted that although the probabilistically shaped digital communication system, a transmitter (010) and a receiver (030) include components including an input/output interface circuit, a processor (processors or a signal processor) and a memory (memories), such components are omitted for simplifying the figure.

Data from a data source (001) is sent to a transmitter (Tx) (010). For example, the data is first sent to a probabilistic shaping mapper (011) and then the data is sent to a forward error correction (FEC) encoder block (012), to produce a set of bits where some are shaped, and others (in particular, parity bits from the FEC encoder) are uniformly distributed. After encoding, the bits are mapped to quadrature amplitude modulation (QAM) symbols (013), before the signal undergoes digital signal processing (DSP) (014). In some embodiments, DSP also performs other function such as mapping, filtering and pre-equalization. The signal is then sent to the transmitter front end (015), where analog operations such as amplification, filtering, modulation and up-conversion occur, and then transmitted over a channel (020) to a receiver (Rx) (030). For instance, the channel (020) may be air medium for radio communications (wireless communication channel), a cable (metal cable, e.g. copper cable) for wired communications or an optical fiber cable for fiber-optic communications.

At the receiver, the signal first passes through the receiver front end (031) for performing analog operations such as down-conversion, amplification, filtering and quantization of the received signal to produce a digital signal. The digital signal is processed by a digital signal processor (032) for functions such as front-end correction, chromatic dispersion compensation, equalization and carrier phase estimation. The noisy QAM symbols then undergo demapping (033) to, for example, bit log-likelihood ratios (LLRs). The FEC code is then decoded (034), before the decoded bits are sent to the probabilistic shaping demapper (035). The demapped and uniformly distributed bits are then sent on to their destination, e.g., the data sink (040).

Figure 1B:
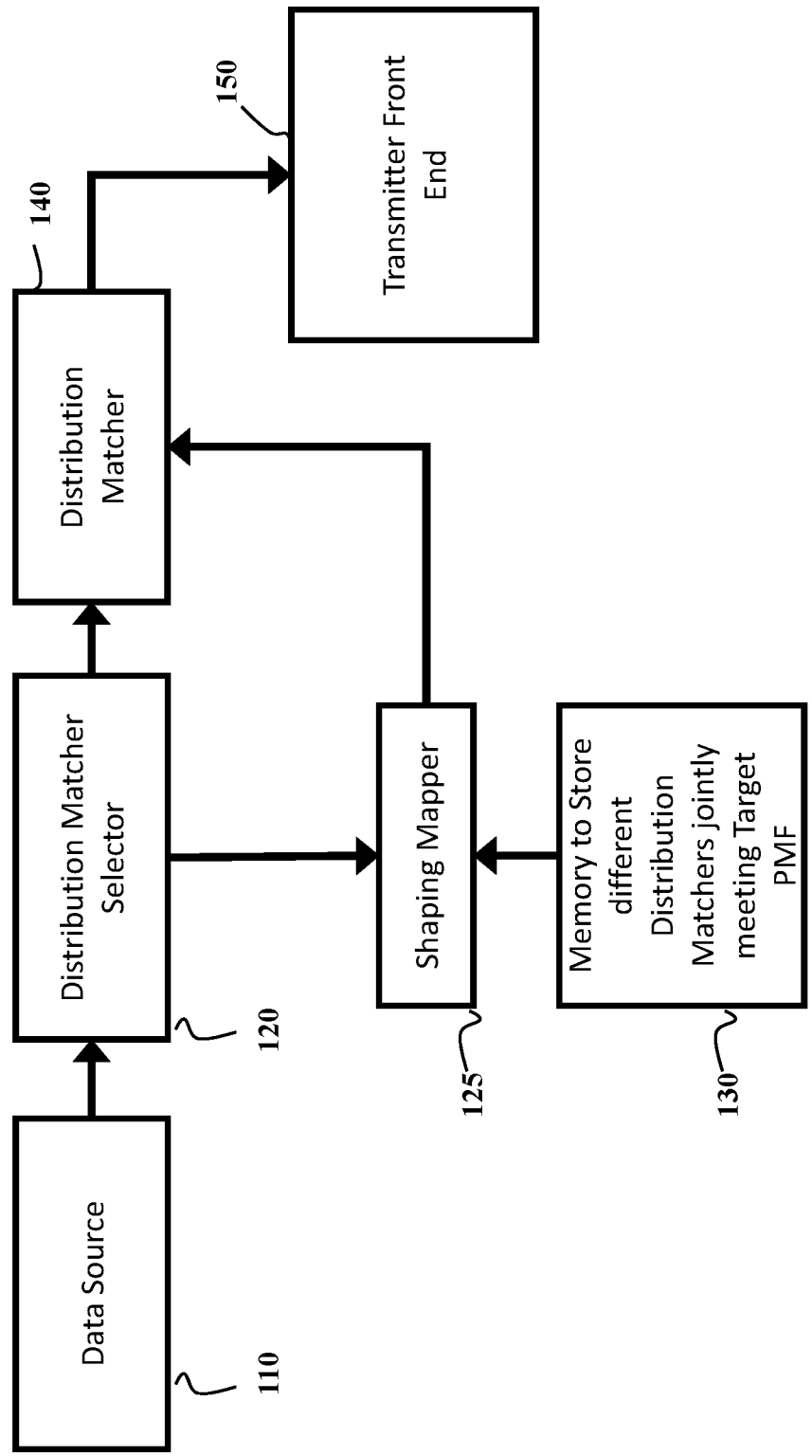
FIG. 1B shows a block diagram of a communication system, according to some embodiments.

FIG. 1B shows a block diagram of a communication system according to some embodiments. A data source (110) receives a block of bits, at least some of which are sent to a distribution matcher selector (120). A memory (130) to store a set of distribution matchers, each distribution matcher being associated with a probability mass function (PMF) to match equally likely input bits to a fixed number of output bits with values distributed according to the PMF of the distribution matcher. A shaping mapper (125) is used to select the distribution matcher (140) from the set of distribution matchers with the selection probability and to map the block of bits to a block of shaped bits with a non-uniform distribution using the selected distribution matcher. A transmitter front end (150) is then used to transmit the block of shaped bits over a communication channel, such that bits in a sequence of the blocks of shaped bits are distributed according to the target PMF. In some cases, the communication channel (020) can be any one of air medium for radio communication channel, a copper cable for wired communication channel, a solid-state drive for data storage transferring communication channel, and a fiber cable for fiber-optic communication channel. In other words, the communication channel is any one of a fiber-optic communication channel, a wired communication channel, a data storage transferring communication channel and a radio communication channel.

In such a manner, some embodiments transform an input sequence of bits with equiprobable, i.e., uniform, distribution of values of bits into an output sequence of symbols with values of bits with desired non-uniform distribution. Some embodiments partition a set of symbols into a number of unique subsets, each of which has a number of possible unique permutations. In such a manner, the desired total distribution of the symbol set is achieved by using a number of smaller sets which do not individually have the desired distribution, but have an average distribution which is equal to the desired distribution. In some embodiments, the distribution is defined by the probability mass function (PMF) reflecting the discrete nature of digital signal processing. To that end, the desired distribution is referred herein as the target PMF. According to some embodiments, the target PMF is a Maxwell-Boltzmann distribution.

Figure 1C:
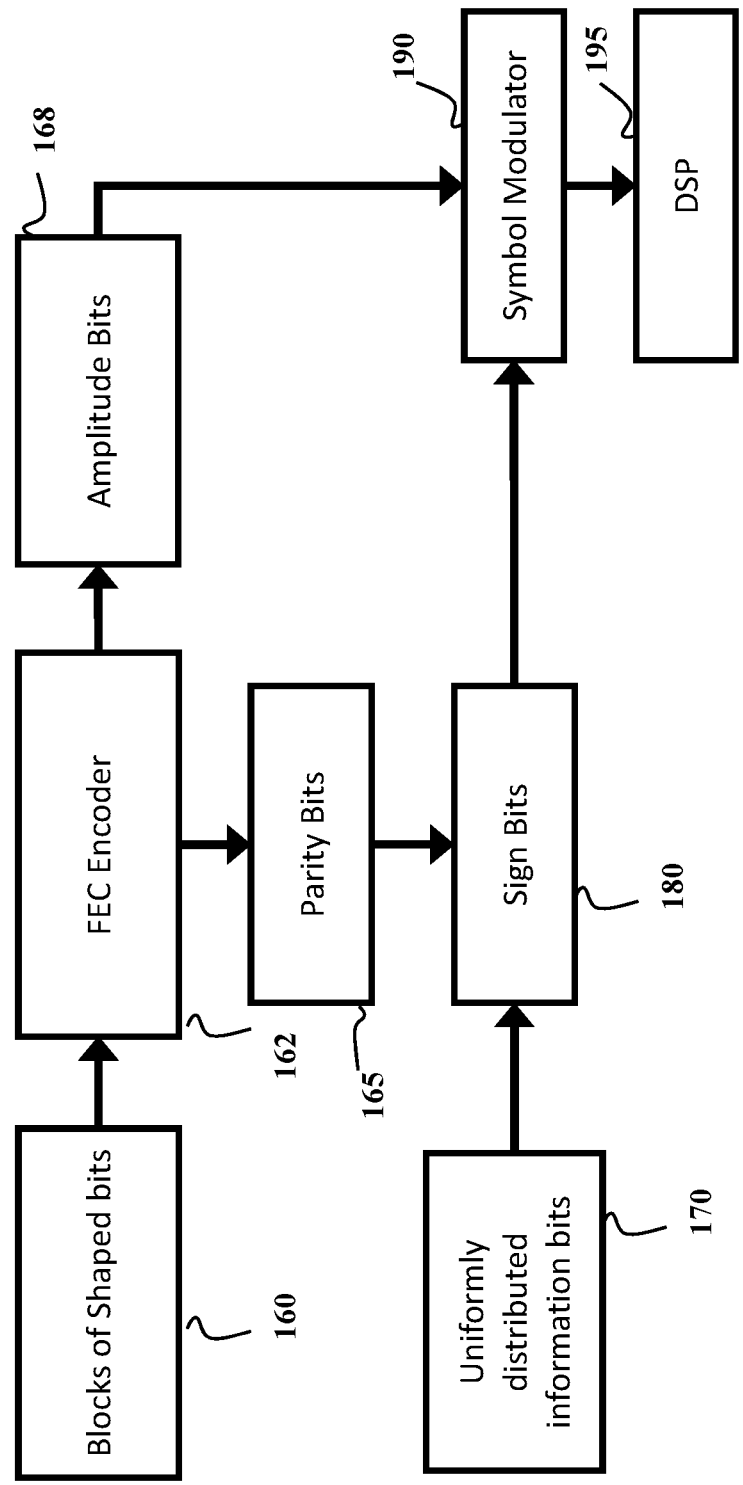
FIG. 1C shows a schematic of the forward error correction (FEC) used in systems employing probabilistic amplitude shaping (PAS), according to some embodiments.

FIG. 1C shows a schematic of the forward error correction (FEC) used in systems employing probabilistic amplitude shaping (PAS), according to some embodiments of the present invention. A block of shaped bits (160) are passed to an FEC encoder (162) to generate parity bits (165) which are used to form the sign bits (180) of QAM symbols, optionally, information bits (170) may also be used for some of the required sign bits (180). The shaped amplitude bits (168) and the uniformly distributed sign bits (180) are then used as the input to the symbol modulator (190), from which symbols are sent on to the transmitter DSP (195).

Figures 1D, 1E:
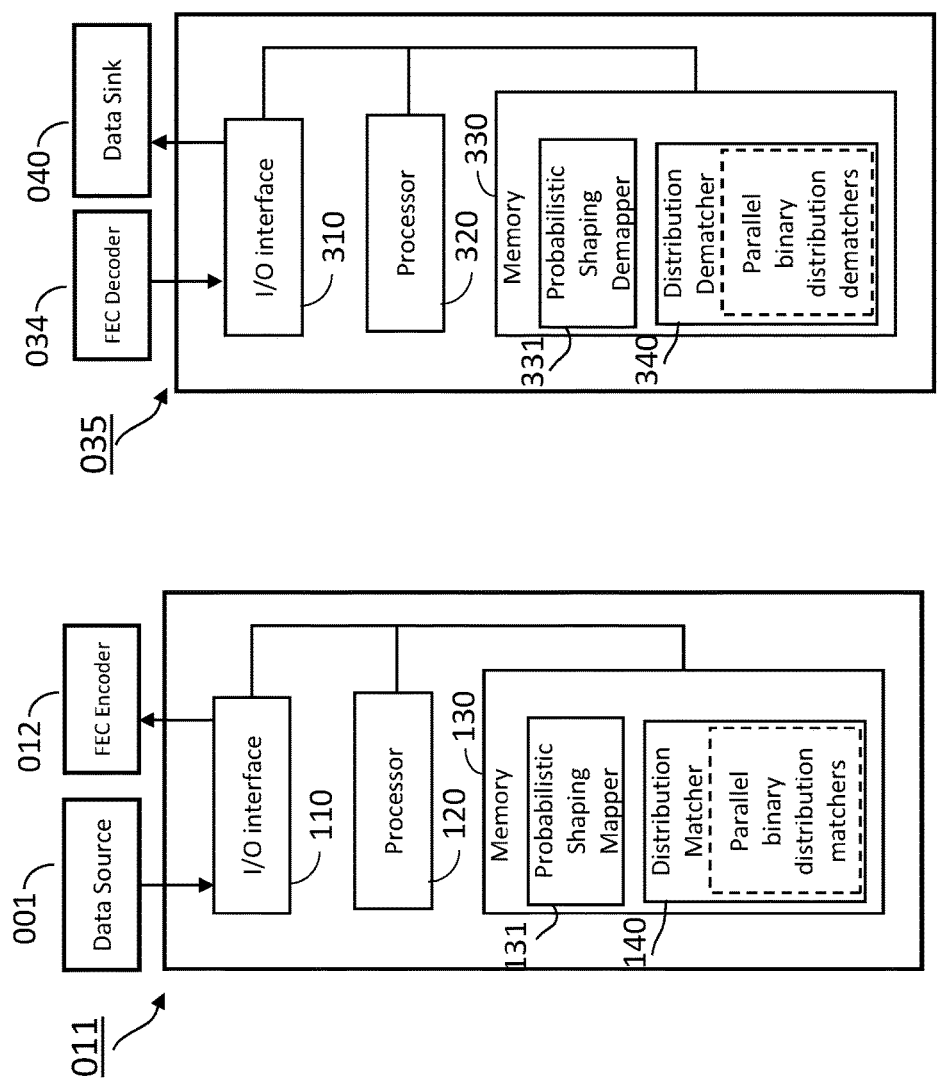
FIG. 1D shows a probabilistic shaping mapper unit, according to embodiments of the present invention.
FIG. 1E shows a probabilistic shaping demapper unit, according to embodiments of the present invention.

FIG. 1D shows a probabilistic shaping mapper unit (011), according to embodiments of the present invention. Data from a source (001) is acquired by an interface (110), which sends it for processing in a processor (at least one processor or digital signal processor) (120) with data stored in memory (130), containing the parameters for a probabilistic shaping mapper (131) and a distribution matcher (140). After processing, data is sent from the interface (110) to the FEC encoder (012).

FIG. 1E shows a probabilistic shaping demapper unit (035), according to embodiments of the present invention. Data from an FEC decoder (034) is sent via an interface (310) to be processed in a processor (at least one processor or digital signal processor) (320). It is processed with data stored in memory (330), containing the parameters of a probabilistic shaping demapper (331), and a distribution dematcher (340). After processing, the data is sent via an interface (310) to the data sink (040).

Figure 1F:
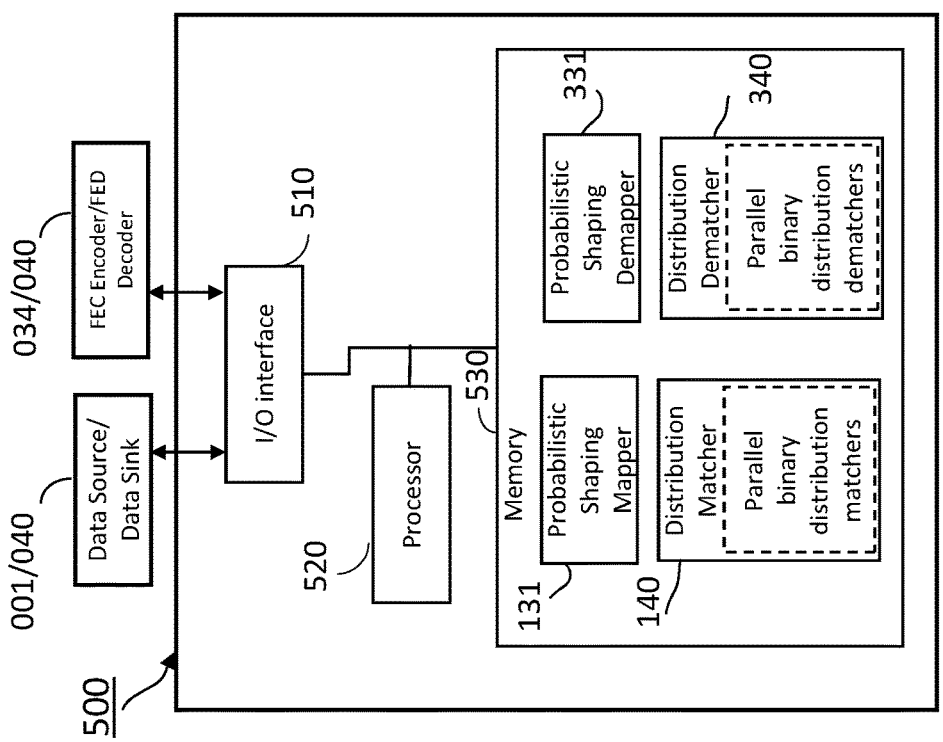
FIG. 1F shows a probabilistic shaping mapper/demapper integrated unit, according to some embodiments of the present invention.

FIG. 1F shows a probabilistic shaping mapper/demapper integrated unit 500, according to some embodiments of the present invention.

The probabilistic shaping mapper/demapper integrated unit 500 includes a mode switch (not shown) and an interface (510) that sends data for processing in a processor (at least one processor or digital signal processor) (520) with the data stored in a memory (530), containing the parameters for a probabilistic shaping mapper (131) and a distribution matcher (140). After processing, data is sent from the interface (510) to the FEC encoder (034). Further, the I/O interface 510 receives data from an FEC decoder (034) and send the data to the processor (520) to be processed It is processed with data stored in memory (330), containing the parameters of a probabilistic shaping demapper (331), and a distribution dematcher (340). After processing, the data is sent via an interface (510) to the data sink (040).

The components included in the probabilistic shaping mapper/demapper unit (500) may be identical to those included in the probabilistic shaping mapper unit (010) and the probabilistic shaping demapper unit (035), so that one of the functions of the probabilistic shaping mapper unit (010) and the probabilistic shaping demapper unit (035) can be performed by controlling/setting a mode switch (not shown) arranged in the probabilistic shaping mapper/demapper integrated unit 500 to a probabilistic shaping mapper mode or a probabilistic shaping demapper mode. The mode switch may be a program switching unit (not shown) that selects one of the functions of the probabilistic shaping mapper and demapper being performed based on an input command from a user. Further the mode switch may be a hardware switch (not shown) arranged in the probabilistic shaping mapper/demapper integrated unit 500, and the mode switch can be selected by manually (by user) or an input command from a user.

Figure 2A:
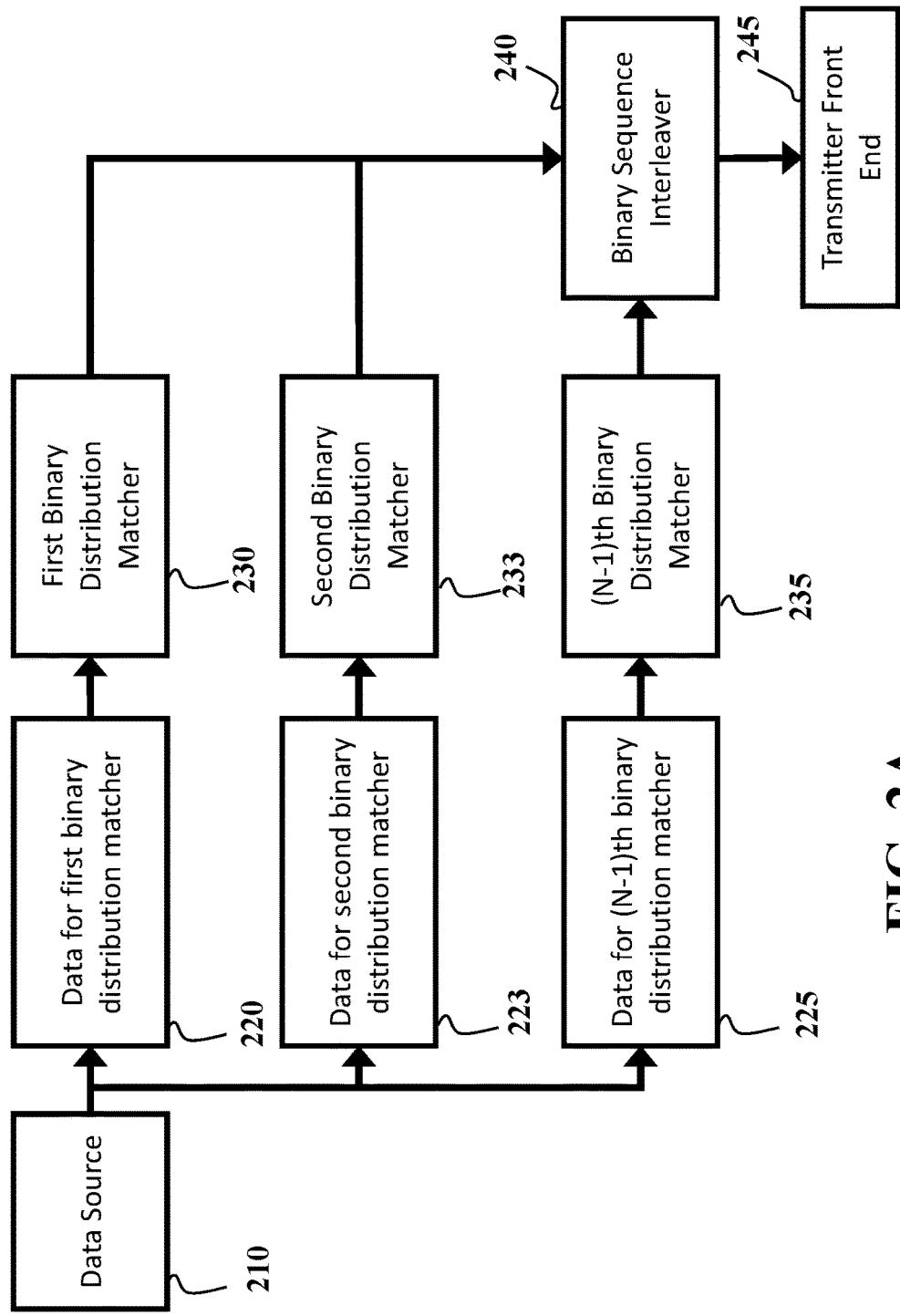
FIG. 2A shows a distribution matcher employing multiple parallel binary distribution matchers, according to some embodiments of the present invention.

FIG. 2A shows a distribution matcher employing multiple parallel binary distribution matchers according to some embodiments of the present invention, illustrating a Parallel Binary DMs as an example input M-B PMF. Data from a source (210) is divided into multiple blocks of data. Data for a first binary distribution matcher (220) is sent to a first binary distribution matcher (230); data for a second binary distribution matcher (223) is sent to a second binary distribution matcher (233); data for a N−1 th distribution matcher (225) is sent to an N−1th distribution matcher (235). In this manner, any arbitrary distribution (for example, the Maxwell-Boltzmann distribution), with cardinality N may be represented with N−1 binary distributions. The output of the binary distribution matchers is sent to a binary sequence interleaver (240) to reconstitute the sequence of cardinality N, before being sent on to the transmitter front end (245).

Figure 2B:
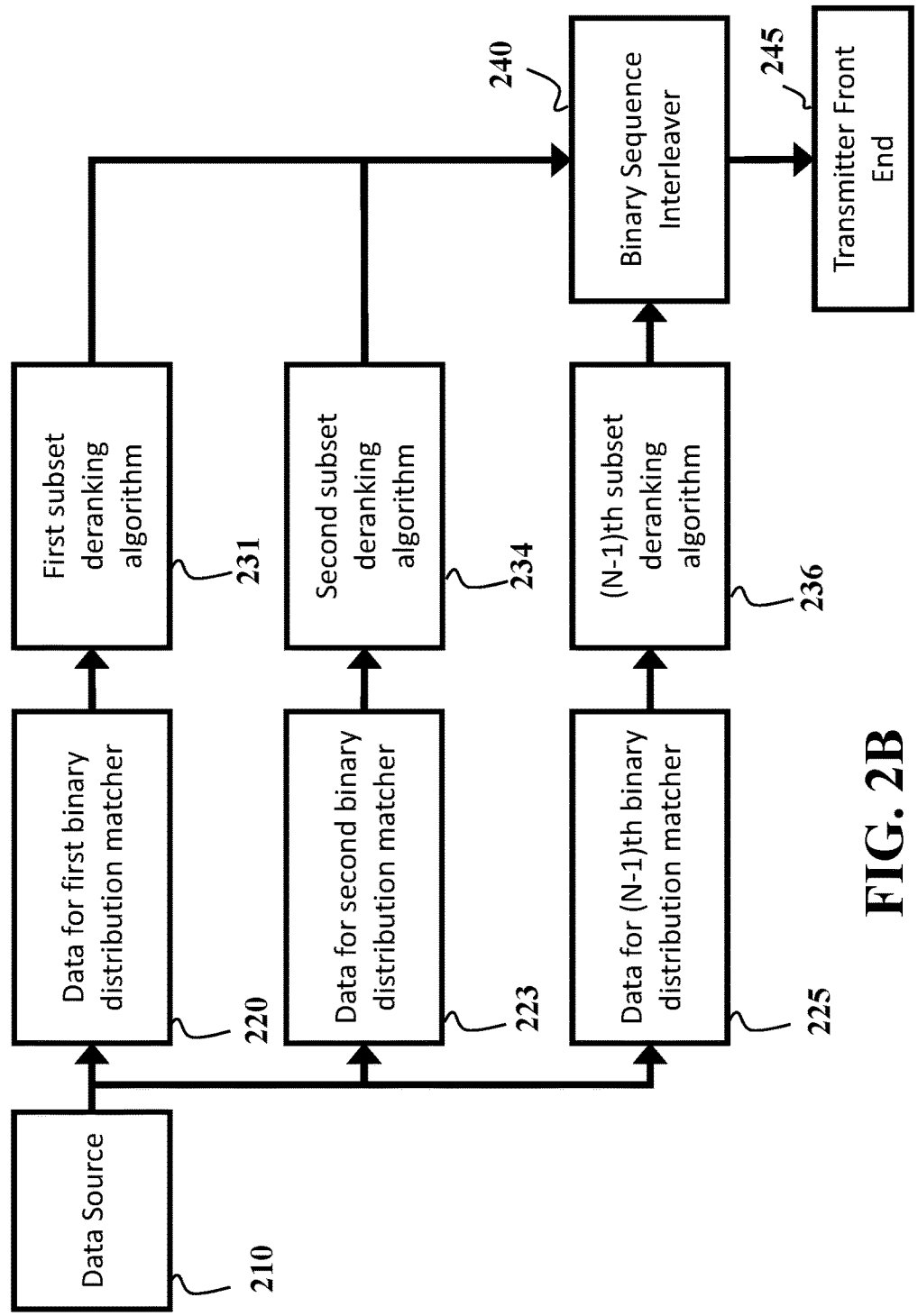
FIG. 2B shows a distribution matcher employing multiple parallel subset deranking algorithm based binary distribution matchers, according to some embodiments of the present invention.

FIG. 2B shows a distribution matcher employing multiple parallel subset deranking algorithm based binary distribution matchers, illustrating a Parallel Binary DMs using subset ranking.

Data from a source (210) is divided into multiple blocks of data. Data for a first binary distribution matcher (220) is sent to a first subset deranking algorithm (231); data for a second binary distribution matcher (223) is sent to a second subset deranking algorithm (234); data for a N−1 th distribution matcher (225) is sent to an N−1th subset deranking algorithm (236). The output of the binary distribution matchers is sent to a binary sequence interleaver (240) to reconstitute the sequence of cardinality N, before being sent on to the transmitter front end (245).

Figure 3:
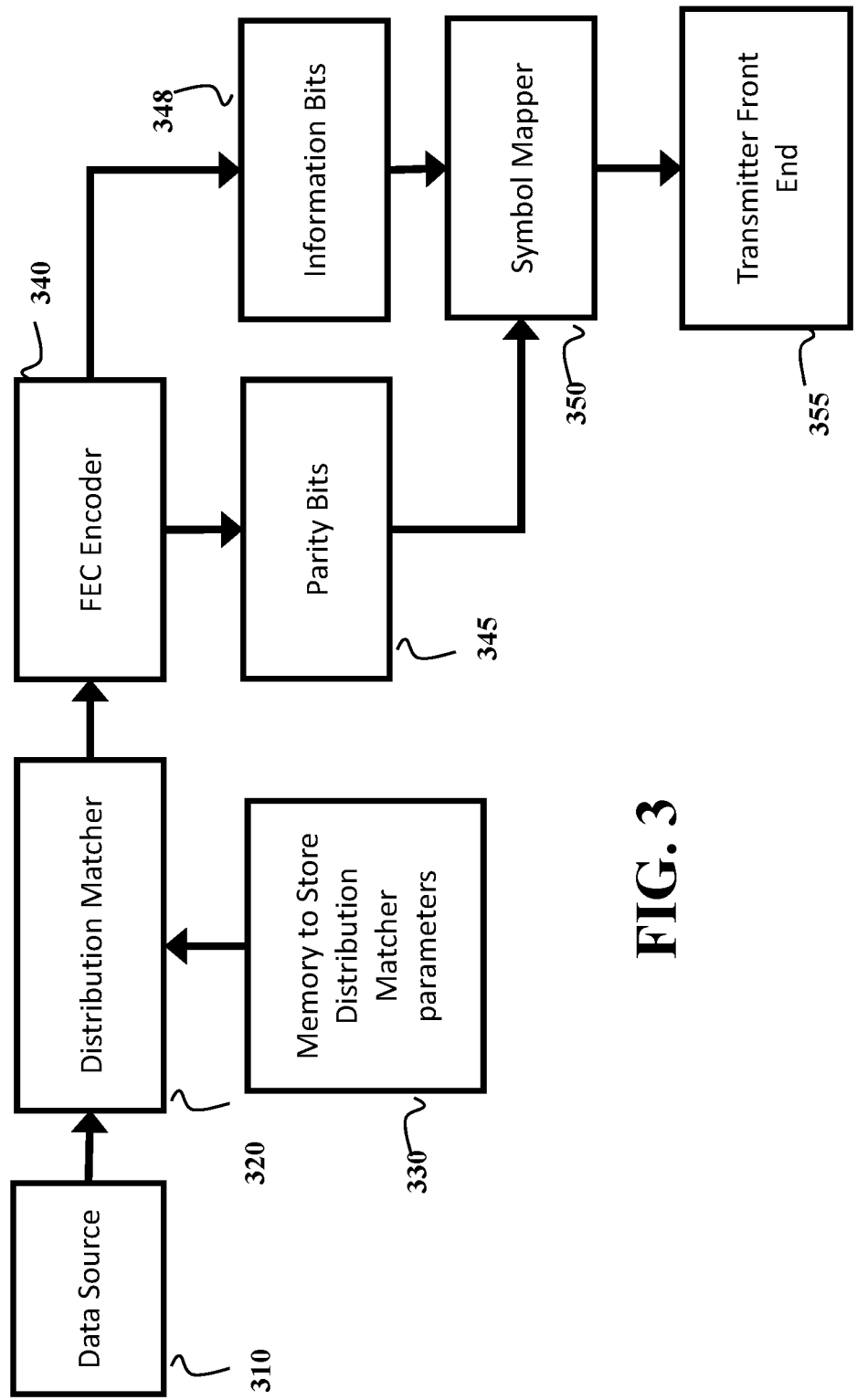
FIG. 3 shows a schematic of a transmitter employing PAS, according to some embodiments of the present invention.

FIG. 3 shows a schematic of a transmitter employing PAS, including FEC and symbol mapper. Data from a source (310) is sent to a distribution matcher (320). The distribution matcher (320) provides a mapping of uniform bits to some unique symbol sequence with desired symbol probabilities (corresponding to, for example, the Maxwell-Boltzmann distribution). Processing is performed with the aid of some memory (330) to store the distribution matcher parameters. Bits from the distribution matcher (320) are the sent to an FEC encoder (340), which outputs uniformly distributed parity bits (345), and shaped information bits (348). These bits are used to drive a symbol mapper (350) wherein the parity bits form the uniformly likely sign of the symbol, and the information bits form the unequally likely shaped amplitude of the symbol. The sequence of symbols is then sent on to the transmitter front end (355).

Figure 4:
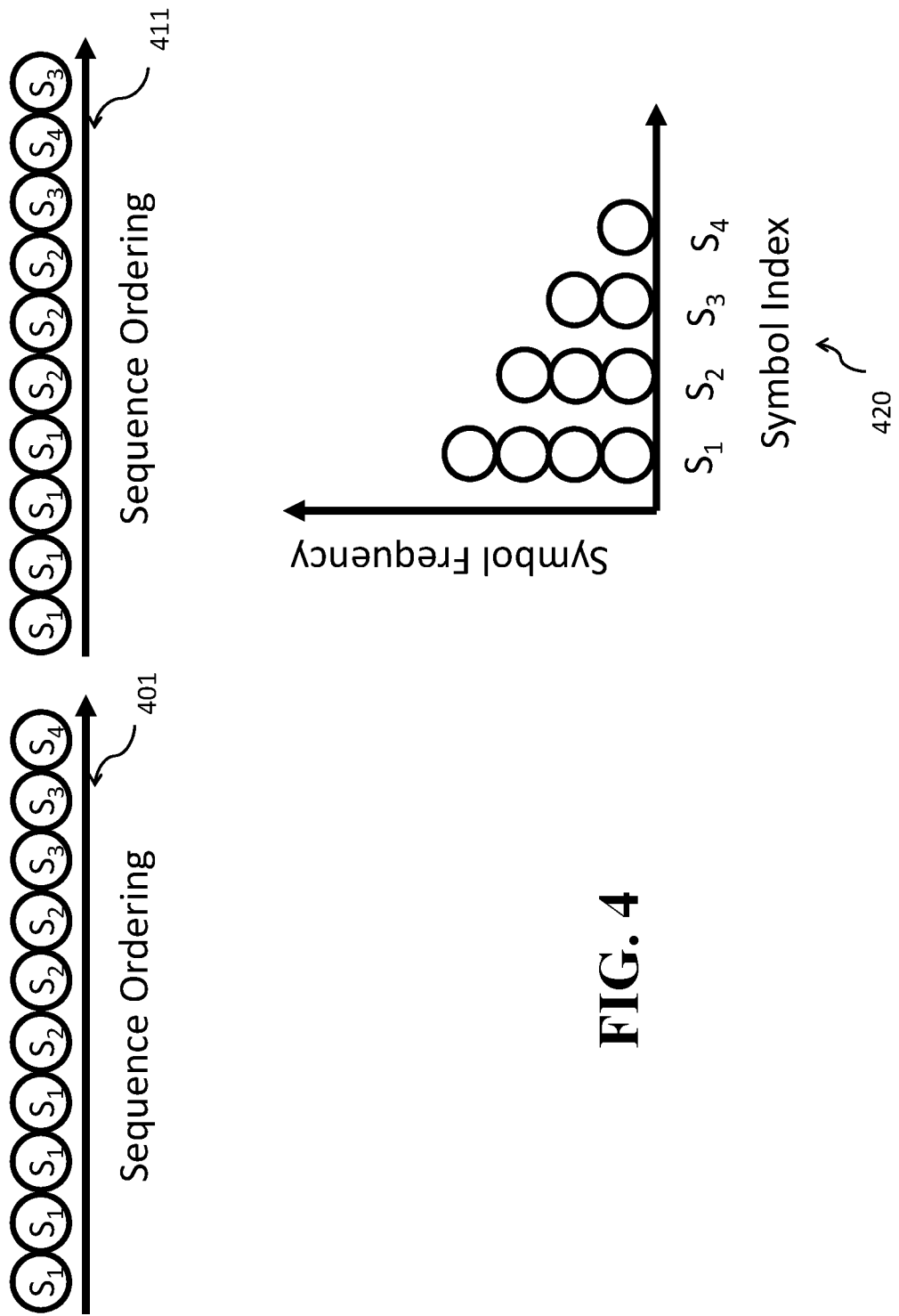
FIG. 4 shows the principle of constant composition distribution matching (CCDM system), according to some embodiments of the present invention.

FIG. 4 shows the principle of constant composition distribution matching (CCDM system), according to some embodiments of the present invention. Different sequences (401) and (411) are simply permutations of each other, and both have the desired symbol frequency, as determined by the PMF of the distribution matcher (420).

Figure 5A:
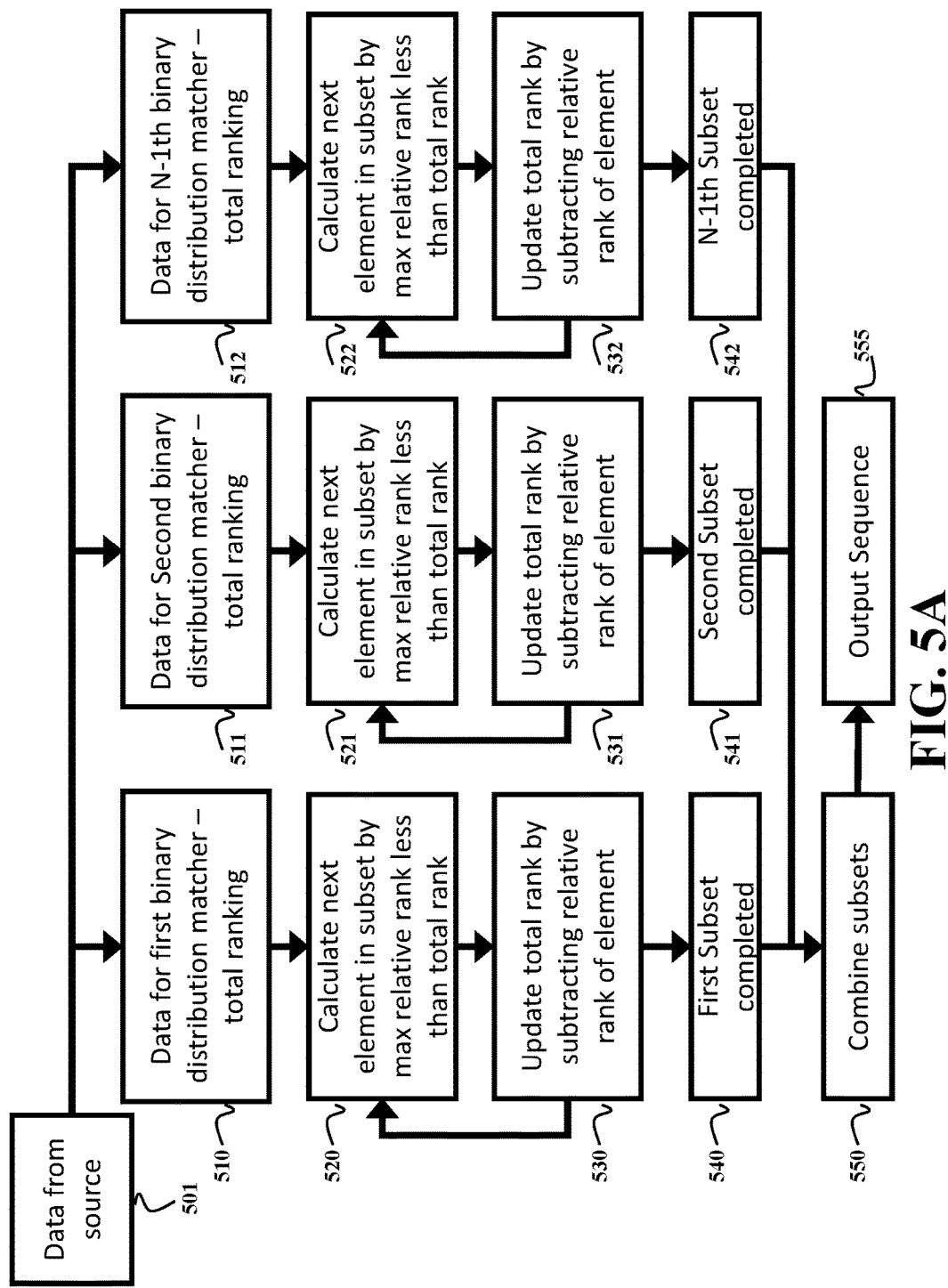
FIG. 5A shows a schematic of operation for a distribution matcher operating with N−1 parallel binary distribution matchers, according to embodiments of the present invention.

FIG. 5A shows a schematic of operation for a distribution matcher operating with N−1 parallel binary distribution matchers operating with the subset deranking algorithm according to embodiments of the present invention. The figure illustrates a flow chart for transmitting an output sequence of combined subsets. This operation may be referred to and a Parallel SR method.

Data from a source (501), is broken into N−1 different input words. These input words are the total subset rank (510, 511, 512) for the N−1 subsets that the algorithm will generate. In each of the parallel distribution matchers, the algorithm finds the position of the subset elements iteratively. The position of the element is found by comparing the total rank to the possible minimum rank of all words with different positions of the element (250,521,522) (i.e., the relative rank for given position). When the maximum possible relative rank less than the total rank is found, the position of an element is determined. The total rank is then reduced by the relative rank of the element that was determined (530,531,532), and the process is repeated, until the positions of all elements in each subset is completed (540,

541,542). These subsets are then combined (550) to produce the output sequence (555) with cardinality N.

Figure 5B:
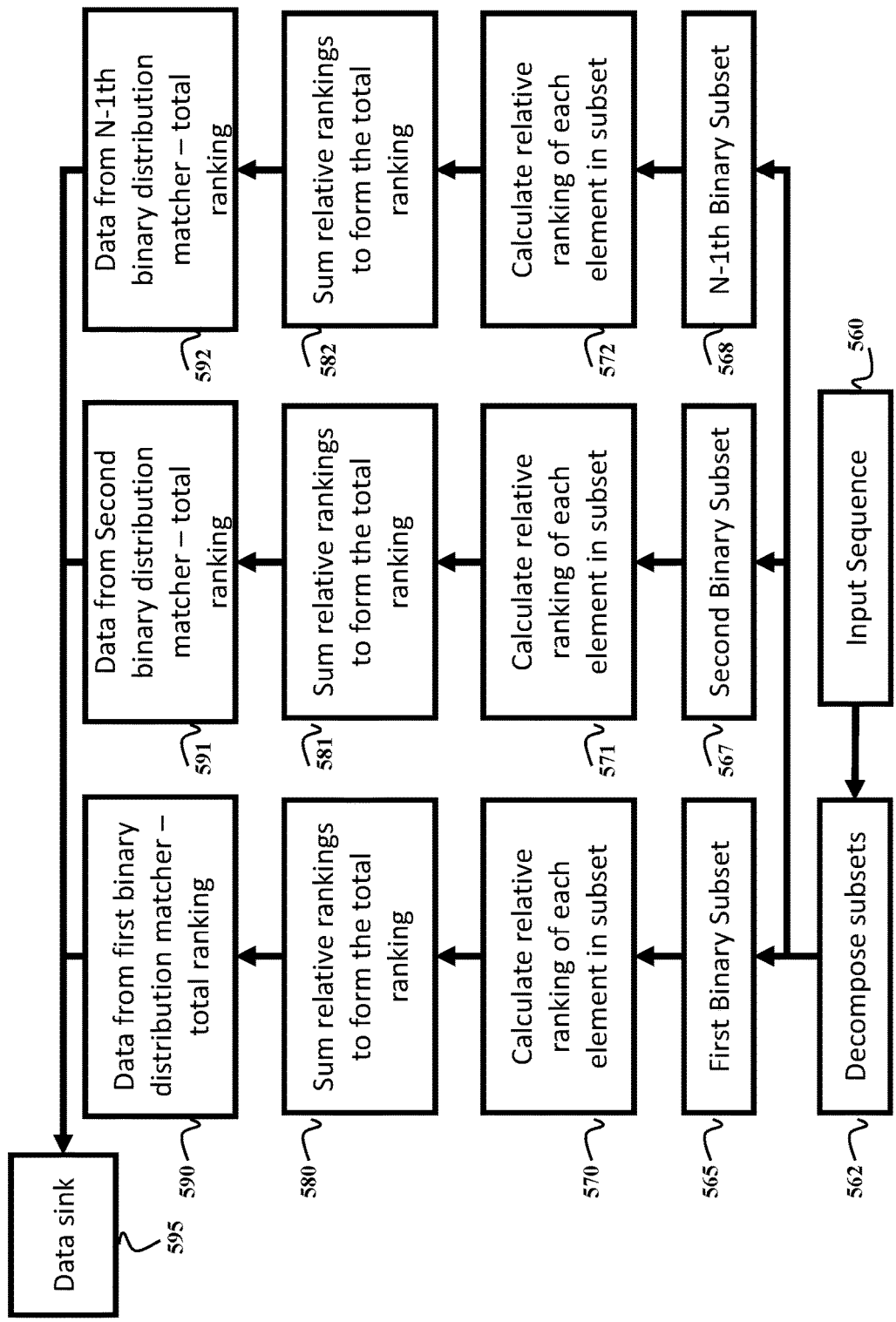
FIG. 5B shows a distribution dematcher operation, using multiple parallel binary distribution dematcher, according to embodiments of the present invention.

FIG. 5B shows a distribution dematcher operation according to embodiments of the present invention, using multiple parallel binary distribution dematcher, each using the subset ranking algorithm, illustrating a flow chart of the algorithm. This operation may be referred to as a Parallel SR method for DM. An input sequence (560) is decomposed (562) into N−1 binary subsets (656,567,568). For each element in the subset, a relative ranking is calculated (570,571,572). These relative rankings are summed to produce a total ranking for each subset (580,581,582). These rankings form the output of the binary distribution dematchers (590,591,592). This data is collected and sent to the data sink (595).

Figure 6A:
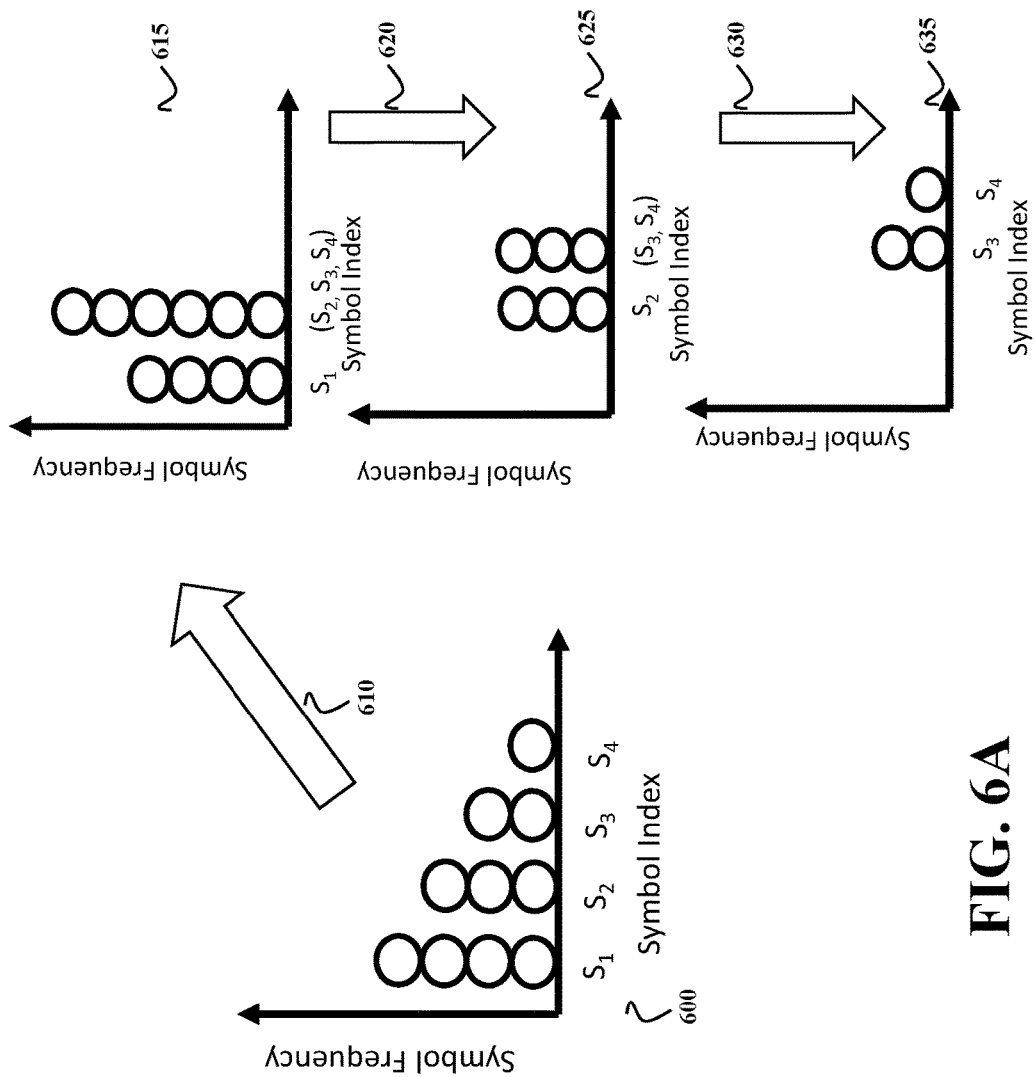
FIG. 6A shows an example of the decomposition of a cardinality 4 distribution into 3 parallel binary distributions, according to embodiments of the present invention.

FIG. 6A shows an example of the decomposition of a cardinality 4 distribution into 3 parallel binary distributions according to embodiments of the present invention, illustrating an algorithm flow for breaking down non-binary distribution into multiple parallel binary distributions. An initial distribution with cardinality 4 (600) is decomposed (610) into a first binary distribution (615) comprising one element in the original distribution (600) and a second element representing all other elements. The second element in this binary distribution is further decomposed (620) into a new distribution (625) based on the second element in the previous distribution (615). The new distribution is a subdistribution of the previous distribution (615) comprising the second element in the original distribution (600), and a second element comprising the combination of the third and fourth elements in the original distribution (600). The second element in this distribution (625) is again decomposed (630) into a final binary distribution (635), were the first and second elements are the third and fourth elements respectively in the original distribution (600).

Figure 6B:
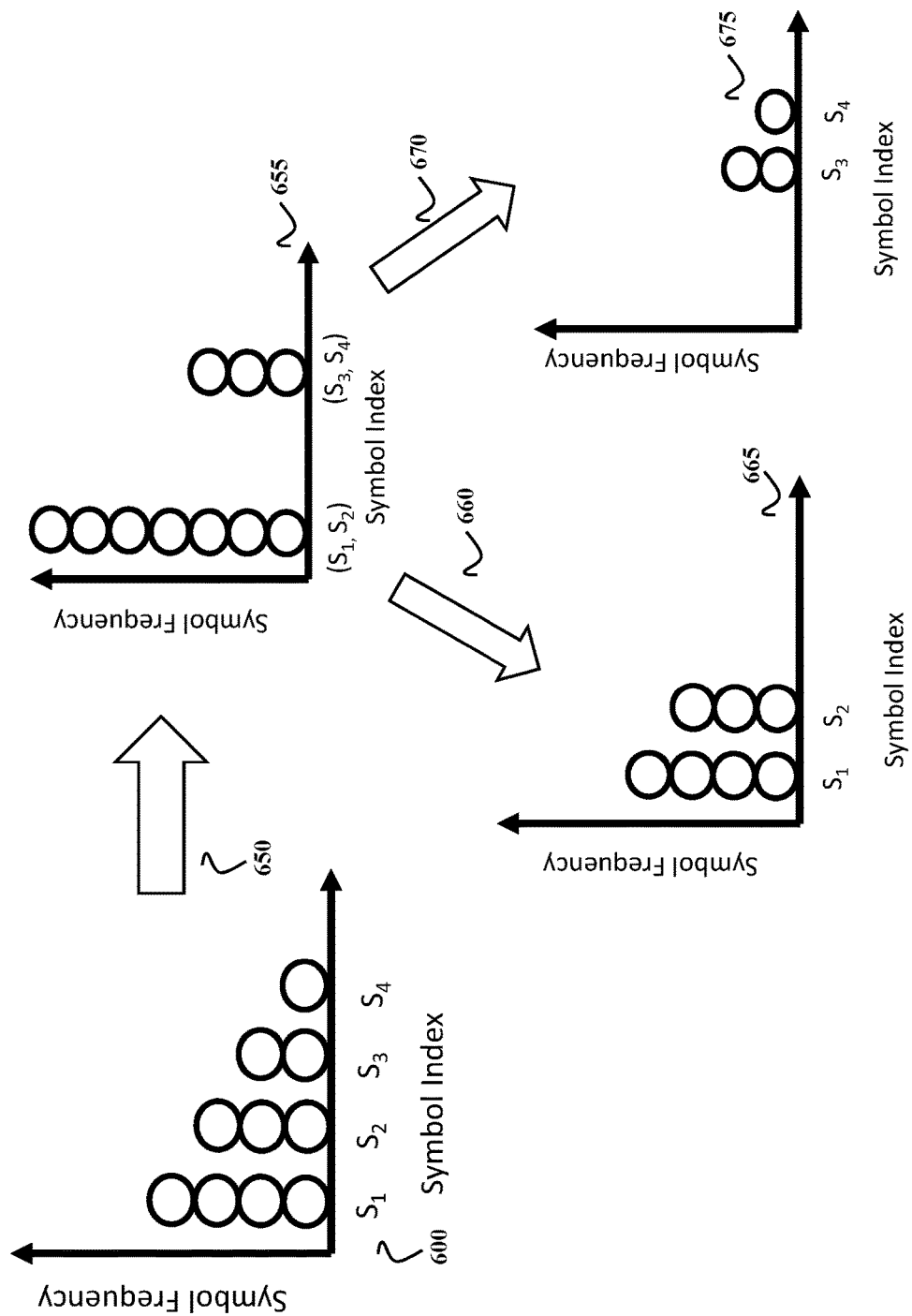
FIG. 6B shows an alternate method for decomposing a cardinality 4 distribution into 3 parallel binary distributions, according to embodiments of the present invention.

FIG. 6B shows an alternate method for decomposing a cardinality 4 distribution into 3 parallel binary distributions according to embodiments of the present invention, illustrating an algorithm flow for breaking down non-binary distribution into multiple parallel binary distributions. An original, cardinality 4 distribution (600) is decomposed (650) into a first binary distribution (655) for which the first and second elements correspond to the combination of the first and second, and the combination of the third and fourth elements in the original distribution (600) respectively. The first element in this first binary distribution (655) is then decomposed (660) into a second binary distribution (665), wherein the first element and second element correspond to the first and second elements in the original distribution (600) respectively. The second element in the first binary distribution (655) is then decomposed (670) into a third binary distribution (675), wherein the first element and second element correspond to the third and fourth elements in the original distribution (600) respectively.

Figure 7A:
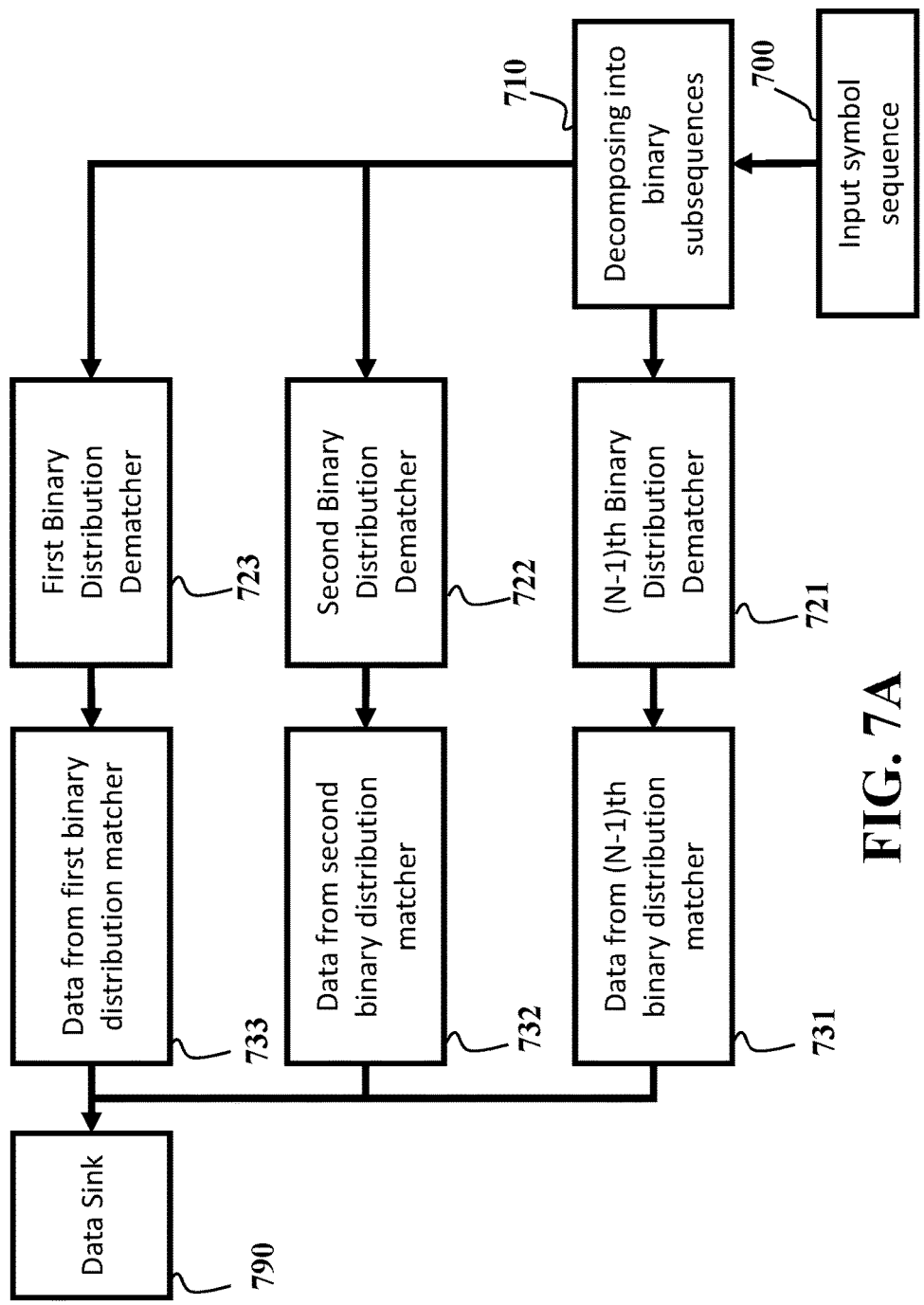
FIG. 7A shows a distribution dematcher for a distribution with cardinality N utilizing multiple parallel binary distribution dematchers, according to embodiments of the present invention.

FIG. 7A shows a distribution dematcher for a distribution with cardinality N utilizing multiple parallel binary distribution dematchers, illustrating a receiver system for dematching with parallel binary DMs. An input sequence (700) is decomposed (710) into multiple binary subsequences. The subsequences are processed in N−1 parallel binary distribution matchers (721,722,723), to produce N−1 data outputs (731,732,733), which are combined and sent to a data sink (790).

Figure 7B:
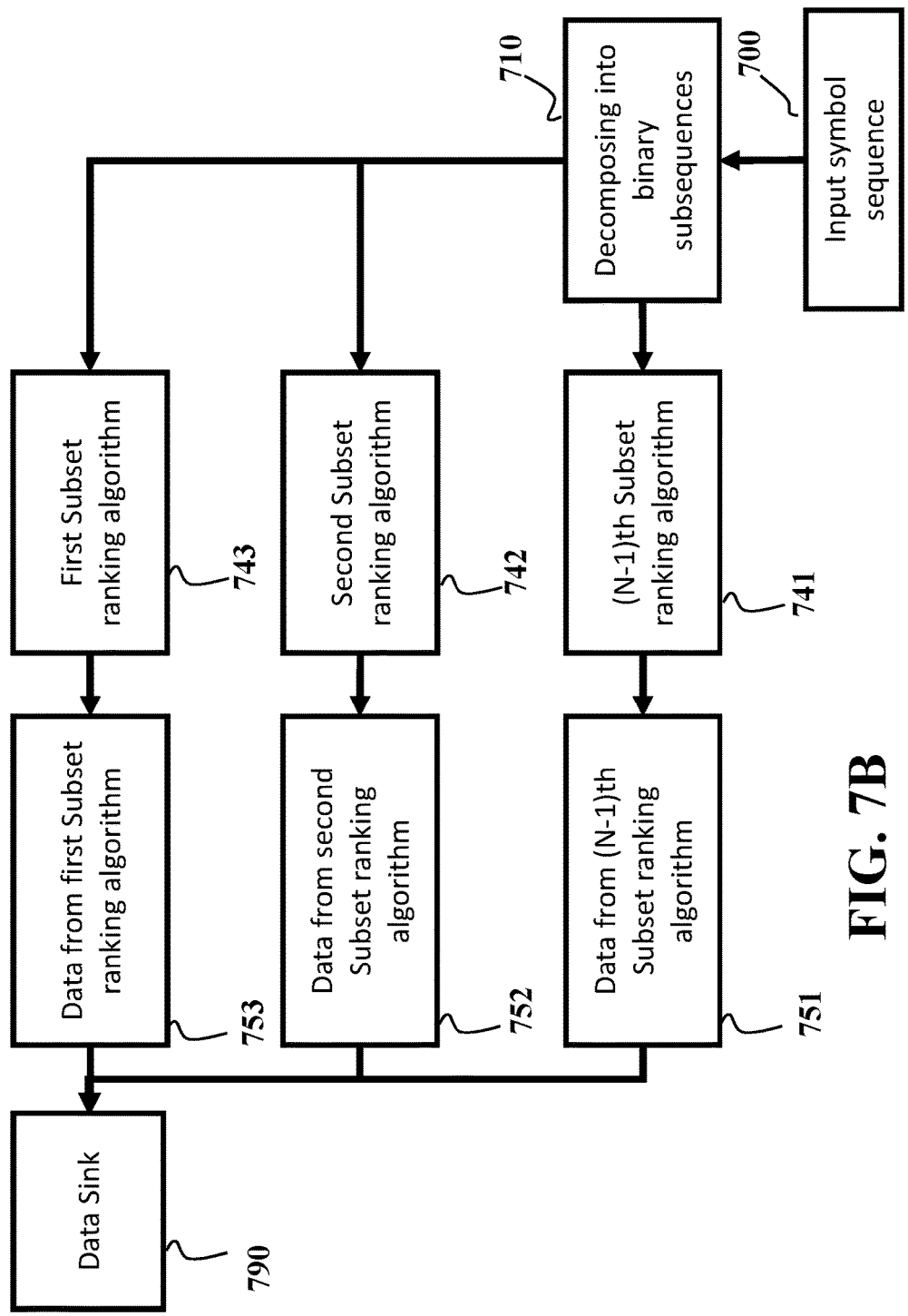
FIG. 7B shows a distribution dematcher for a distribution with cardinality N utilizing multiple parallel binary distribution dematchers based on the subset ranking algorithm, according to embodiments of the present invention.

FIG. 7B shows a distribution dematcher for a distribution with cardinality N utilizing multiple parallel binary distribution dematchers based on the subset ranking algorithm according to embodiments of the present invention, illustrating a receiver system for dematching with parallel binary DMs. An input sequence (700) is decomposed (710) into multiple binary subsequences. The subsequences are then ranked in N−1 parallel binary subset ranking distribution matchers (741,742,743), to produce N−1 data outputs (751, 752,753), which are combined and sent to a data sink (790).

Figure 8A:
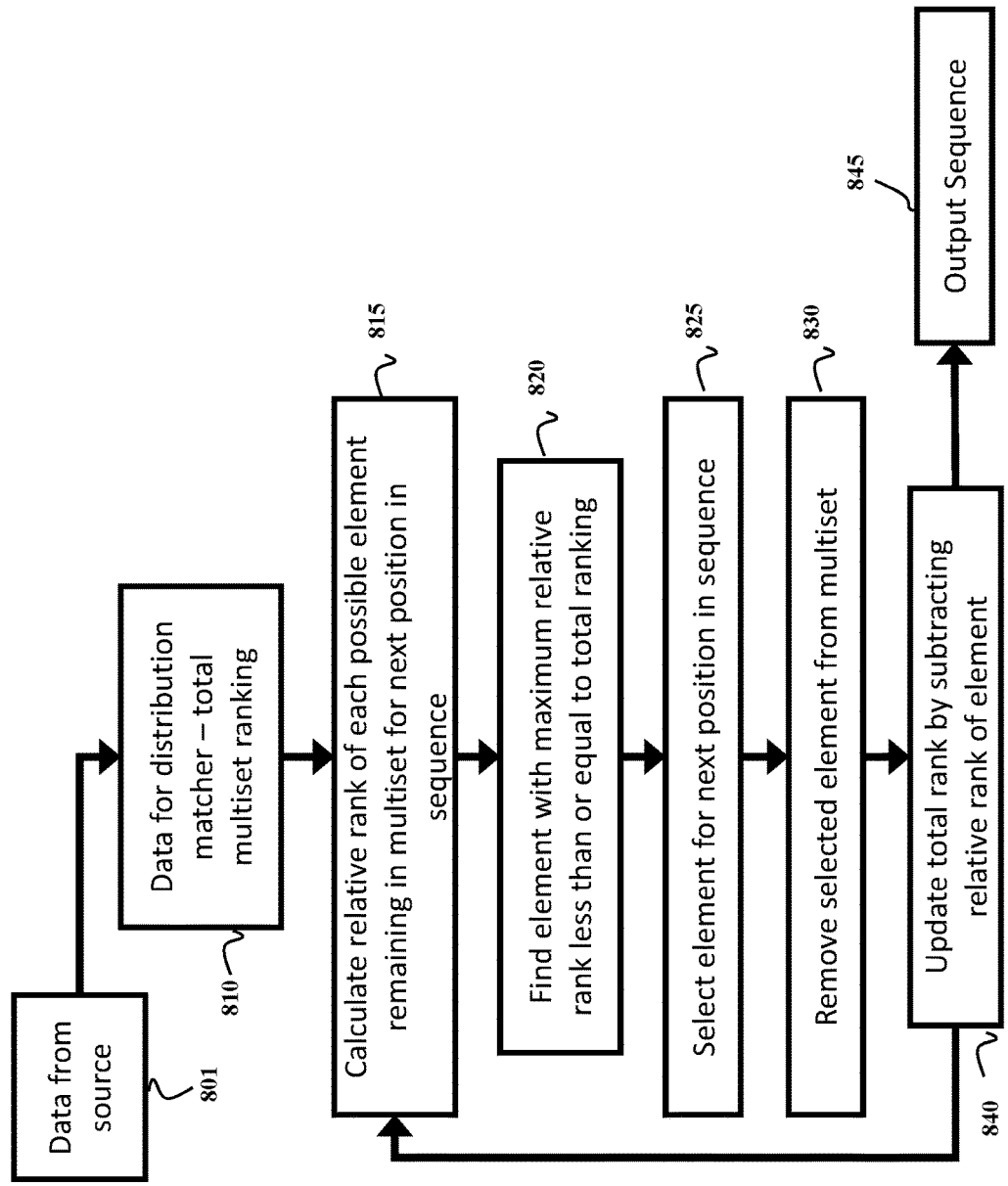
FIG. 8A shows an algorithm for distribution matching a distribution with arbitrary cardinality based on multiset deranking, according to embodiments of the present invention.

FIG. 8A shows an algorithm for distribution matching a distribution with arbitrary cardinality based on multiset deranking according to embodiments of the present invention, illustrating an algorithm flow chart for transmitting an output sequence. This algorithm may be referred to a multiset deranking method for DM. Data from a source (801) is used as the total rank of the sequence from the desired multiset (810). The relative rank of each possible element in the next position is calculated (815), and the element with maximum relative rank less than the total ranking is determined (820). This element is then selected as the next element in the sequence (825). The selected element is then removed from the multiset (830), and the total rank updated by subtracting the relative rank of the selected element (840). This process is repeated until elements are selected for all positions in the sequence, determining the output sequence (845).

Figure 8B:
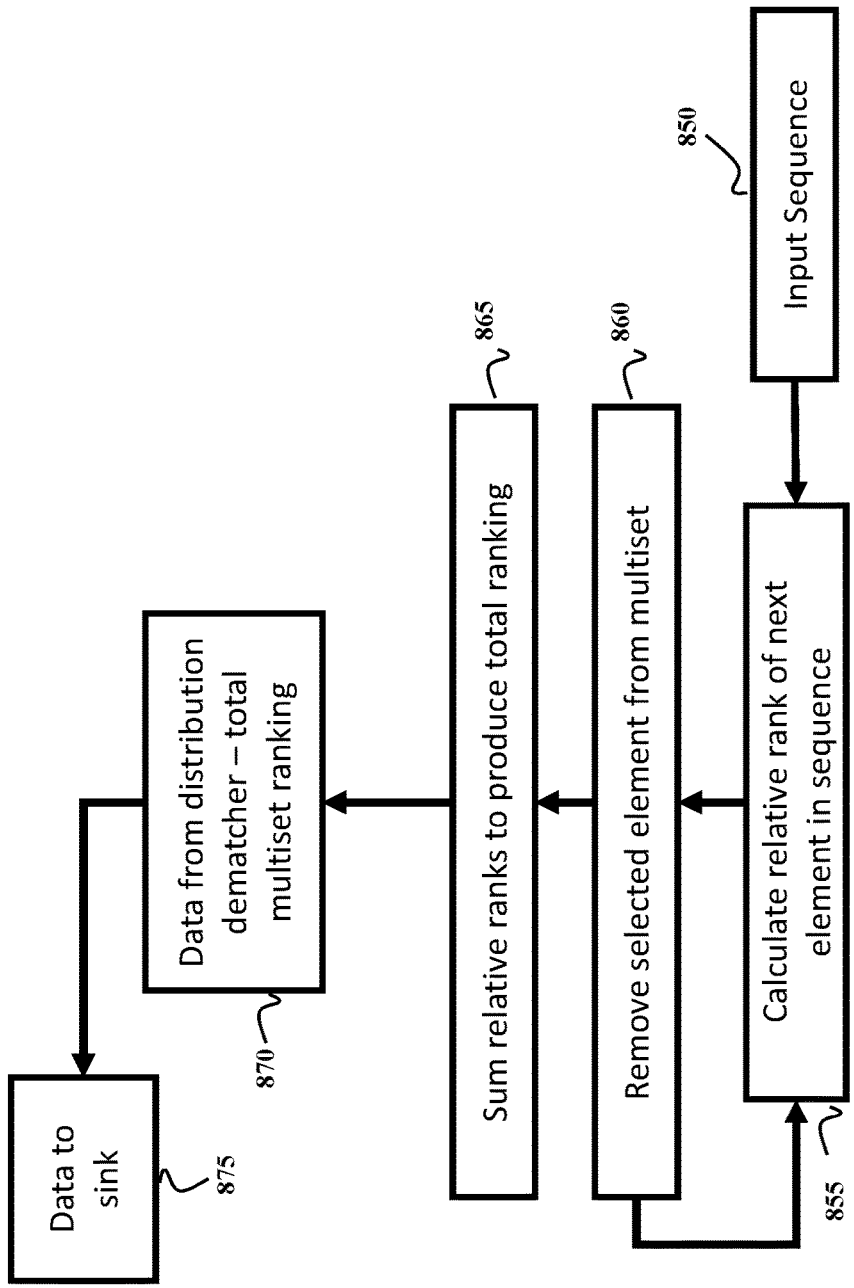
FIG. 8B shows a schematic of an algorithm for distribution dematching with a multiset ranking algorithm, according to embodiments of the present invention.

FIG. 8B shows a schematic of an algorithm for distribution dematching with a multiset ranking algorithm according to embodiments of the present invention, illustrating an algorithm flow chart for receiving data by a receiver. This algorithm may be referred to as a Multiset ranking method.

From an input sequence (850), the algorithm calculates the relative rank for the next element in the sequence (855), by calculating the number of sequences with lower rank than the input sequence (850). The selected element is then removed from the multiset (860), and the operations are repeated for every element in the sequence. The relative ranks are then summed (865) to produce a total ranking. This total ranking forms the data output (870) from the distribution matcher, which is sent to a data sink (875).

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

We claim:

1. A communication system, comprising:
   a data source to receive a block of bits;
   a processor:
   a memory, in connection with the processor, to store a distribution matcher associated with a probability mass function (PMF) configured to match a block of equally likely input bits to a fixed number of output bits with values distributed according to the PMF of the distribution matcher using the processor, wherein the distribution matcher contains a set of parallel binary distribution matchers which specify fully a target PMF; and
   a transmitter front end to transmit a block of shaped bits over a communication channel, such that bits in a sequence of the blocks of shaped bits are distributed according to the target PMF.

2. The communication system of claim 1, wherein the target PMF is a Maxwell-Boltzmann distribution.

3. The communication system of claim 1, wherein the parallel binary distribution matchers each select a position of a single element of a symbol set within an output symbol sequence.

4. The communication system of claim 3, wherein the parallel binary distribution matchers each select the position of a number of elements of the output symbol sequence within a total sequence.

5. The communication system of claim 3, wherein the binary distribution matcher is implemented by performing subset de-ranking on the block of input bits to determine the output symbol sequence.

6. The communication system of claim 1, further comprising:
   an FEC encoder to generate uniformly distributed parity bits from blocks of shaped bits with the block of shaped bits and to combine the parity bits with the bits of the blocks of shaped bits.

7. The communication system of claim 6, wherein at least some of the parity bits are sign bits.

8. The communication system of claim 7, further comprising:
   a modulator to modulate the sequence of the blocks of shaped bits onto amplitude bits of QAM symbols, with at least some of the sign bits being determined by the parity bits; and
   a digital signal processor for processing the modulated sequence of the blocks of shaped bits for analog transmission over the communication channel.

9. The communication system of claim 1, wherein symbols of the block of shaped bits produced by the distribution matcher are selected from a finite set of symbols, and wherein a frequency of occurrence of different symbols in the block of shaped bits is defined by the PMF of the distribution matcher.

10. The communication system of claim 9, wherein distribution matcher permutes a sequence of symbols occurring in the sequence with frequencies defining the PMF of the distribution matcher for different values of the bits in the block of input bits.

11. The communication system of claim 9,
    wherein the processor is configured to
    produce a set of binary distributions defined by the target PMF and with a total number of symbols defined by lengths of output binary subsequences defined as binary combinations of symbols in the output symbol sequence;
    match the blocks of input bits to the output binary subsequences of symbols as defined by the binary distribution matchers;
    combine the output binary subsequences in a manner described by the set of binary distributions in such a manner that determines an entire sequence of symbols with the target PMF; and
    output the sequence to a transmitter front end.

12. The communication system of claim 9,
    wherein the processor is configured to
    produce a set of an input binary subsequences defined by binary combinations of symbols in the output symbol sequence;
    match the input binary subsequences to sub-blocks of output bits as defined by the binary distribution matchers;
    combine the sub-blocks of output bits to form a block of output bits; and,
    output the block of output bits.

13. The communication system of claim 9,
    wherein the processor is configured to
    produce a first master distribution determined by the PMF of the distribution matcher;
    produce a first binary distribution including a first possible symbol, and all other symbols not equal to the first possible symbol, according to the first master distribution;
    produce a second master distribution equal by removing the first possible symbol from the first master distribution of the distribution matcher;
    produce a second binary distribution including a second possible symbol, and all other symbols not equal to the second possible symbol, according to the second master distribution; and
    produce subsequent master distributions by removing a symbol from the master distribution; and
    produce subsequent binary distributions including a subsequent symbol and all other symbols not equal to the subsequent symbol, according to the subsequent master distribution.

14. The communication system of claim 1, further comprising:
    a receiver front end to receive a block of shaped symbols transmitted over a communication channel; and
    a receiver memory to store a set of binary distribution dematchers, each binary distribution dematcher is associated with a corresponding binary distribution matcher.

15. The communication system of 14, wherein the receiver memory stores a distribution dematcher, associated with the probability mass function (PMF) to match input symbol sequences with blocks of output bits according to the PMF of the distribution dematcher, wherein the distribution dematcher contains a set of parallel binary distribution dematchers.

16. The communication system of claim 15, wherein the binary distribution dematchers are implemented by performing subset ranking on input symbol subsequences to determine sub-blocks of output bits.

17. The communication system of claim 1, further comprising:

a transmitter to transmit information whereby the distribution matching is performed by performing multiset deranking on the input bits to produce a sequence of shaped bits;

a receiver to receiver information whereby the distribution dematching is performed by performing multiset ranking on a shaped input symbol sequence to produce an output bit sequence.

18. A method for communicating symbols of bits, wherein the method uses a processor coupled with a memory storing instructions for implementing the method, wherein the instructions, when executed by the processor carry out at least some steps of the method, comprising:

receiving a block of bits;

sending blocks of bits to a set of binary distribution matchers from the memory storing a set of binary distribution matchers, wherein each binary distribution matcher is associated with a probability mass function (PMF) to match equally likely input bits to a fixed number of output bits with values distributed according to the PMF of a distribution matcher, wherein each binary distribution matcher is associated with a binary distribution, such that a combination of the binary distribution matchers equals a target PMF;

mapping the blocks of bits to blocks of shaped bits with a non-uniform distribution using the set of binary distribution matchers;

combining the blocks of shaped bits using a structure determined by the binary distribution matchers; and transmitting the blocks of shaped bits over a communication channel, such that bits in a sequence of the blocks of shaped bits are distributed according to the target PMF.

* * * * *